L. M. CASELLA.
THERMOMETER.
No. 175,926. Patented April 11, 1876.
Witnesses
Otto Hufeland
Hugo Bruggemann
Inventor.
Louis M. Casella
per
Van Santvoord & Hauff
Attorneys
N. PETERS, PHOTO-LITHOGRAPHER, WASHINGTON, D. C.

UNITED STATES PATENT OFFICE.

LOUIS MARINO CASELLA, OF LONDON, GREAT BRITAIN.

IMPROVEMENT IN THERMOMETERS.

Specification forming part of Letters Patent No. 175,926, dated April 11, 1876; application filed March 15, 1876.

*To all whom it may concern:*

Be it known that I, LOUIS MARINO CASELLA, of Holborn Bars, London, E. C., in Kingdom of Great Britain, have invented a new and useful Improvement in Self-Registering Thermometers, which improvement is fully set forth in the following specification, reference being had to the accompanying drawing, which represents a side view of my thermometer on an enlarged scale and partly in section.

In maximum-registering thermometers, as generally made, a small portion of the column of mercury is separated from the remaining portion by an air-speck, the action being such that when the column of mercury rises and again falls the portion separated by the air-speck, and which is usually called the "index," remains at the highest point, and therefore registers the maximum temperature. When the thermometer is again required for use this small portion or index is caused to descend by swinging the thermometer or otherwise, and it often happens that in this operation the index reaches the ordinary enlarged part of the bore near the bulb, and joins the main portion of the mercury, thus allowing the air-speck to escape. The article is then no longer a registering-thermometer.

My invention has for its object to avoid all chance of the air-speck escaping in ordinary use, and I effect this by preventing the index from descending below a certain fixed point. To this end I enlarge the bore of the thermometer at such fixed point in such a manner as to form a trap, and when the mercury which constitutes the index reaches this point it becomes shortened in length and globular in form, while, as it has a natural tendency to retain this globular form, it is not liable to descend into the part of the bore of ordinary diameter below. I also contract the bore immediately below the trap, for the purpose of increasing the effect of the latter.

In the drawing, the letter $a$ designates the bore of my thermometer. $b$ is an enlarged part of the bore, forming a trap, and $c$ is a contracted portion thereof, made immediately below the enlargement. $d$ is the part of the mercury termed the "index."

When the thermometer is swung, for the purpose of causing the index to descend from the higher or registering point, the index fills the trap $b$, as shown, and by being thus shortened and made somewhat globular in form it remains in position and is not liable to become lost in the bulb, while by the abrupt contraction $c$ below the trap its effect is still further increased.

It is obvious that my thermometer is not liable to become disarranged by rough usage, whether in the hands of a physician or the most inexperienced person, the index being always prevented from descending below a fixed point.

What I claim as new, and desire to secure by Letters Patent, is—

1. A thermometer having the trap $b$ in its bore, for the purpose of preventing the index from descending below a certain fixed point, substantially as described.

2. A thermometer having the trap $b$ in its bore and a contraction, $c$, to operate in conjunction with the trap, substantially as set forth.

In testimony that I claim the foregoing I have hereunto set my hand and seal this 7th day of February, 1876.

LOUIS MARINO CASELLA. [L. S.]

Witnesses:
   GEO. C. BACON,
   ERNEST NOEL OXLEY.